STEDMAN M. BUTLER
INVENTOR

BY Wm. E. Ford

ATTORNEY

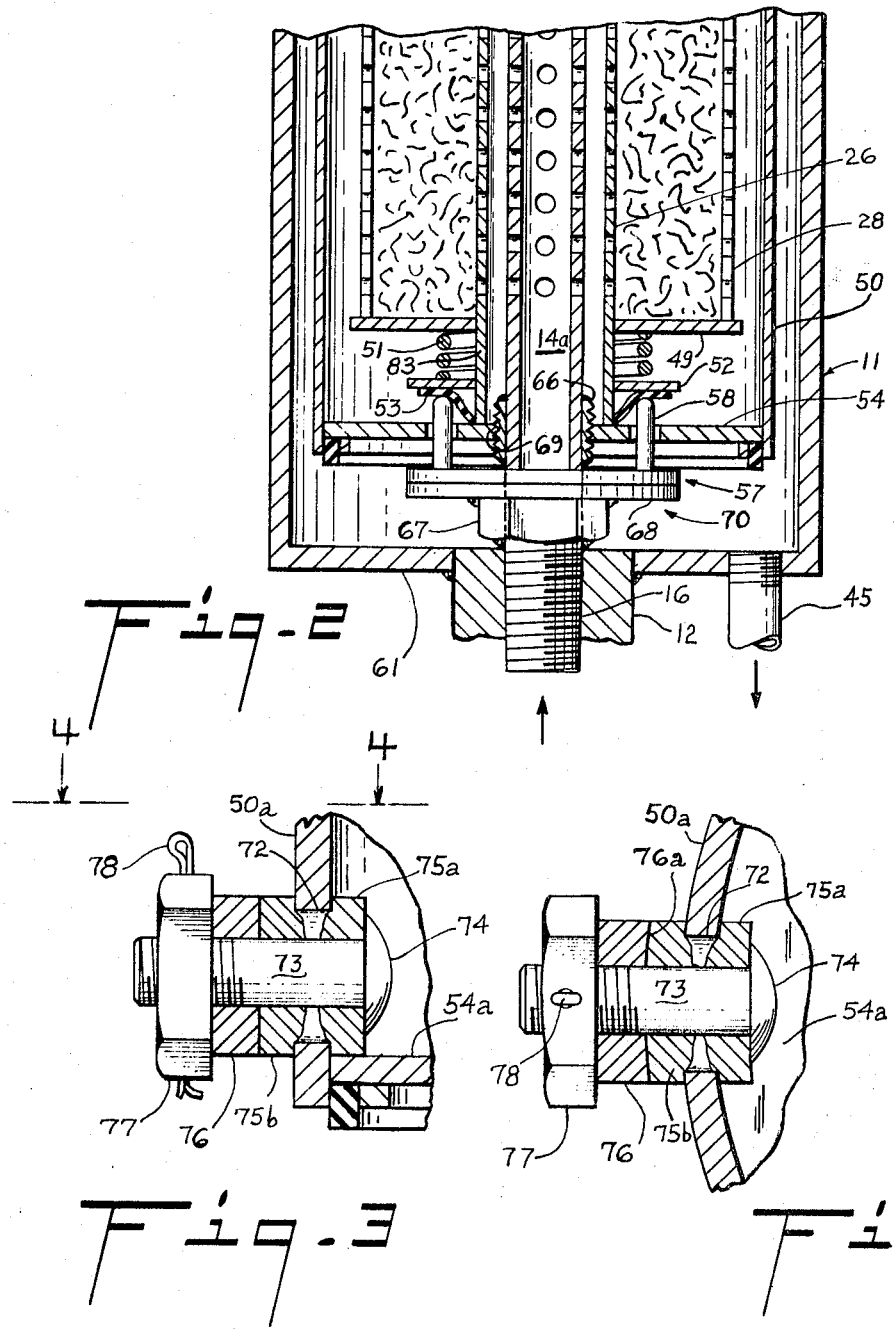

United States Patent Office 3,448,746
Patented June 10, 1969

3,448,746
OIL FILTER CLEANER
Stedman M. Butler, Box 459, Rock Island, Ill. 61201
Filed June 9, 1965, Ser. No. 462,577
Int. Cl. B08b 3/02
U.S. Cl. 134—102                                    1 Claim

ABSTRACT OF THE DISCLOSURE

An oil filter cleaner for oil filters of annular form with an inner cylinder wall depending to seat on a cage bottom with openings therethrough; the openings being occluded by a pliant annular valve ring raised by fingers on spider means as spring tension lets the filter move with relation to a cleansing liquid diffuser in fixed relation to the spider means, the diffuser blowing cleansing liquid outwardly through the filter to pass down through said openings to be drained.

---

This invention relates to a filter cleaner and has particular adaptation to a structure for cleaning oil filters both of the larger types and for smaller automobile filters of the throwaway types, cleansing may be accomplished with all types at convenient times, as at times when the oil is an automobile or truck is being changed.

It is a particular object of this invention to provide a filter cleaner and method by which a filter may be easily, firmly and adjustably positioned, cleansed, and dried by the ejection of cleansing fluid at substantial velocity to pass through the filter on its way to an escape drain.

It is another object of this invention to provide a filter cleaner of this class in which the cleansing fluid is under compressed air pressure and in which the fluid is drawn from the liquid chamber by the force of jetted compressed air through a venturi into a pipe connecting into a coupling into which diffuser of various sizes are threadably adjustable to upstand in filter cores of various heights.

It is also an object of this invention to provide a filter cleaner of this class which is inexpensive of construction, easily operated and readily drained.

It is also an object of this invention to provide a filter cleaner of this class in which the filter is easily and yieldably positioned over the diffuser and easily removed therefrom.

It is also another and most important object of this invention to provide a filter cleaner of this class in which a filter to be cleaned is first connectable onto an adapter diffuser in such a manner that a spider, disposed between the filter and adapter diffuser, is freely and easily relatively slidable as connection is made.

It is also a further and most important object of this invention to provide a filter cleaner of this class in which a compressible or deformable sealing spacer is disposed between the filter base and diffuser in manner that it closes the space therebetween to channelize cleaning fluid through the filter and properly to space the filter in elevation to uncover fluid outlet means therefrom.

It is also an additional object of this invention to make an outlet in the filter case for the soiled cleaning fluid to escape, and to provide a removable closure for the outlet.

Other and further objects will be apparent when the specification hereinbelow is considered in connection with the drawings, in which:

FIG. 2 is a sectional elevational view showing a form of the invention in which a filter is threadably connected to, or equivalently clamped over an adapter diffuser in proper position for cleaning;

FIG. 3 is a fragmentary sectional elevational view of a form of outlet or alternative outlet, with removable closure, which may be provided in a filter case; and FIG. 4 is a fragmentary plan view of the outlet and closure shown in FIG. 3.

Figure 1:
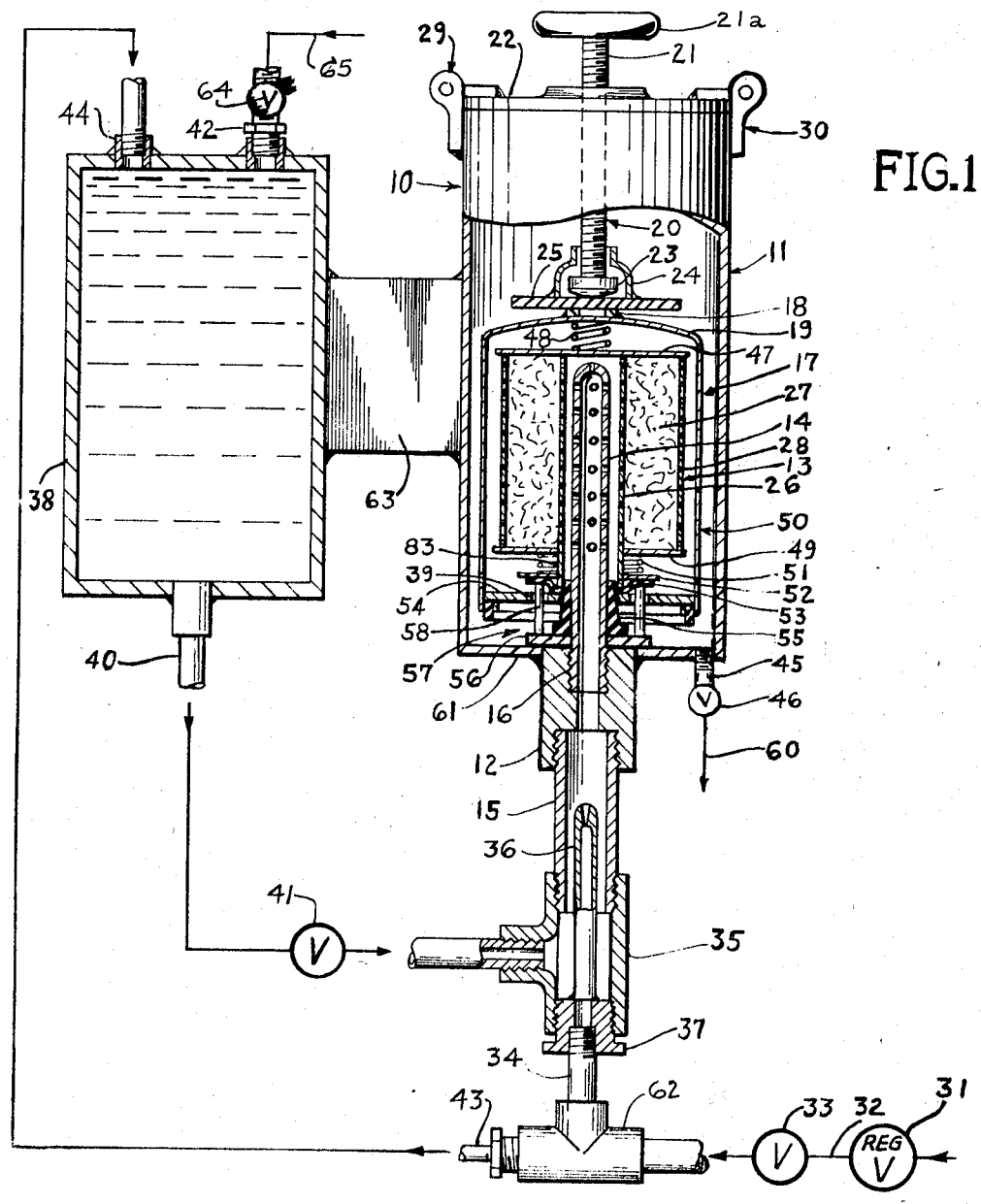
FIG. 1 is an elevational view, part in section, and partially diagrammatic, showing a form of the invention in which a filter is clamped into position for cleaning.

Referring now in detail to the drawings in which like reference numerals are applied to like elements in the various views, a filter cleaner 10 is shown in FIG. 1 as including a cleaning compartment 11 which has a coupling 12 rigidly connected centrally into the bottom 61 thereof. From the lower end of the coupling 12 a pipe 15 extends downwardly, as will be hereinbelow described. Such coupling 12 has the lower, externally threaded end of a perforated diffuser 14 threadably engaged into the internally threaded upper end 16 thereof. Diffusers 14 of various heights may be employed in accordance with the various heights of filters to be cleaned.

The filter shown in the drawings, as the filter 17 shown in FIG. 1, does not constitute any structural part of the invention, but rather comprises the "work" or object which the invention is designed to service. As shown in FIG. 1, the filter 17 includes a filter cage or case 50 which is clamped in position in the cleaning compartment 11 of the invention, the case 50 including a bottom plate 54, and a domed top 19 with a small nut 18 affixed centrally on top thereof.

A clamping assembly 20 includes a reducer 24 as the lowermost element thereof, including a bearing plate 25 as its base, to bear upon the upper surface of the nut 18 on top of the filter 17. Also the clamping assembly 20 includes a threaded rod 21 having a spherical segment at its lower end 23 to bear upon the upper surface of the bearing plate 25, the rod 21 being threadable through a cover 22 which is pivotally connected by a hinge 29 to the upper, outer surface of the cleaning compartment 11. Oppositely of the hinge 29, a latch 30 is connected to the cover 22, with a latch member mounted thereon, normally to pivot downwardly due to the action of a conventional torsion spring, not shown. As an operator grasps and turns the handle 21a at the top of the rod 21, and in direction to move the rod 21 downwardly, the segment at the lower end of the rod 21 bears downwardly on the plate 25, and with the filter cage 50 yieldably supported, as will be hereinbelow described, the filter 17 is clamped into position.

The filter 17 includes, concentric within the cage or case 50, an annular filter member 13, comprising an outer, perforate wall 28 and an inner cylinder 26, having the upper portion perforaed substantially over the same vertical distance as the wall 28, and including a lower, unperforated portion, 83 extending therebelow. The filter member 17 also includes a closure plate or disk 47 which has the upper ends of the outer wall 28 and of the inner wall or core 26 connected thereto, while an annular ring 49 forms the lower closure for the filter member 17 and has the lower end of the outer wall 28 connected thereto, while the lower, unperforated end of the core 26 passes downwardly through the annular ring 49.

The filter member 13 is poised between an upper spring 48, between the inner surface of the domed top 19 and the top surface of the top closure plate or disk 47, and a lower spring 51 which bears upwardly against the under surface of the annular closure ring 49 and which bears downwardly upon an annular plate or bearing ring 52, which is slidable over the lower cylinder part 83 of the filter core 26. The annular ring 52 in turn bears upon an annular gasket 53, which is of the same inner diameter as the inner diameter of the core 26, and on which the lower face of the core 26 seats. As to the outer diameter of the annular gasket 53, this diameter is of sufficient dimension that it can overextend and occlude the ports or holes 39 in the cage bottom or closure plate 54.

In the form of the invention disclosed in FIG. 1, a spider 57 is shown, comprised of an annular ring or plate 56 of inner diameter to slide over the diffuser 14 and seat upon the upper face of the coupling 12 and upon the upper surface of the cleaning compartment closure plate 61 which is flush therewith. Equally, angularly spaced apart studs or fingers 58 upstand from the spider plate 56, and, as shown in FIG. 1, space the gasket 53 above the openings 39 in the cage bottom 54. A frusto-conical gasket 55 having a bore therethrough slightly greater in diameter than the outer diameter of the diffuser 14, is sealably slidable over the diffuser 14 to seat upon the upper surface of the spider plate 56.

Thus, in the relationship of structures shown in FIG. 1, the internally threaded central bore through the cage bottom 54 is sealably engaged with the frusto-conical surface of the gasket 55 to dispose the filter cage 50 in elevation, while the fingers 58 extend through the holes or openings 39 in the cage bottom 54 to keep them open, as the upper spring 48, which is substantially stronger than the lower spring 51, urges the filter member 13 seated on the gasket 53.

Having described the filter 17, as disposed to be cleaned, the operation of the invention may be better understood, from this point, when the usage of the filters and the necessity for cleaning them has been described. In service filters 17 are installed, as in automobiles, the threaded, central bore through the cage bottom 54 being threaded upon an externally threaded tubular member which extends from the engine block of a motor vehicle.

As thus disposed, the cage bottom 54 compresses a gasket therebelow, the gasket being in the shape of an annular ring, concentric about the tubular member and of some lesser outer diameter than the filter cage 50. This gasket seats about a recess in the engine block, concentric about the tubular member, and the soiled or contaminated lubricating oil passes into the recess within the engine block and then through the holes 39 in the cage bottom 54, as the pressure of the lubricating oil is sufficient to lift the gasket 53. As the engine block with gasket, tubular member, and recess are conventional, no drawing is shown of these features, which are not connected with the structures of this invention.

The oil to be filtered passes through the holes 39, lifting the gasket 53, as aforesaid, and circulates within the cage 50 to pass inwardly through the perforated wall 28, and the impurities are impinged on the filtering material 27, as cellulose, while the oil passes on inwardly through the perforated core wall or cylinder 26 to pass downwardly through the aforesaid tubular member which extends from the engine block of the motor vehicle. Then the filtered oil is re-circulated, in its filtered state, to the motor parts to be lubricated, and this process of circulation, filtering, and re-circulation continues, in the cycle as described.

Finally, when the gradual loading of the filtering material 27 with detritus and contamination results in a certain predetermined pressure differential between the lubricating pump pressure and the pressure at which the lubricating oil leaves the filter, at such point the lubricating oil is automatically by-passed from the filter, to pass directly back in re-circulation, in soiled state, through the engine.

As the filtering material 27 has the impurities, detritus, and contamination impinged thereon as the oil to be filtered passes therethrough in one direction, it is best that any cleaning fluid, solvent, or like substance which may be used to clean the filtering material 27 and to act upon the deposit thereon, should be circulated through the filter 17 in the opposite direction. This is accomplished, using apparatus to be hereinbelow described, in connection with a filter 17, in manner to be set forth, with the filter 17 and the apparatus comprising this invention first having been disposed as shown in FIG. 1, in the following manner:

An operator first slips the frusto-conical gasket 55 over a diffuser 14, the diffuser 14 being selected as to proper size for use with the aforesaid filter, and the gasket 55 is then moved along the diffuser 14 to a predetermined longitudinal position. Next, with the compartment lid 22 raised, a disposition is reached in which the spider 57 seats upon the coupling 12, and cleaning compartment bottom 61, with the gasket 55 on top of the spider 57, as both spider and gasket are disposed as aforesaid around the diffuser 14, which has been threaded full up into the coupling threaded bore 16. Then the filter 17 is inserted into the compartment 11 in manner that the diffuser 14 extends within the core 26, and the spider fingers or studs 58 extend through the hole 39 in the filter closure plate or base 54.

Then the lid 22 is closed and the clamp 20 is threaded downwardly to bear upon the nut 18 on top of the dome 19, thus to urge the filter cage 50 downwardly, firmly, and sealably upon the frusto-conical gasket 55, while the lower end 83 of the spring biased filter element 13 bears upon the annular gasket 53, while the studs 58 raise this gasket peripherally.

The compressed air employed in the cleaning operation is supplied through a conduit 32 having therein a pressure regulating valve 31 and also a valve 33. The conduit 32 extends to a T 62 and upwardly through the central leg thereof into a pipe or pipe nipple 34 which has the lower end of a reducer bushing 37 connected to the upper end thereof. In turn, the upper end of the bushing 37 is connected into the lower leg of a T 35. A hollow venturi tube 36 has its open, lower end silver soldered to the top of the reducer 37 and extends upwardly through the T 35, and into a pipe or conduit 15, which has its lower end connected into the upper leg of the T 35, and which is selected to extend for a predetermined distance above the discharge end of the venturi tube 36, the upper end of the pipe or conduit 15 connecting into the lower end of the coupling 12.

A liquid tank or compartment 38 is provided adjacent the compart 11 and may be connected thereto as by the gusset plate 63. A conduit 40 extends from the bottom of the tank 38 to the central branch or leg of the T 35, and such conduit 40 has therein a control valve 41. A coupling 42 connects into the top of the tank 38 and has a valve 64 connected to the top thereof from which a conduit 65 leads to a cleaning fluid reservoir or bulk supply tank, not shown. Also, a pressure equalizing line or conduit 43 extends the compressed air line 32 from the T 62 to be connected into a coupling 44 into the top of the tank 38.

After a filter 17 has been clamped into position and prior to operation the pressure regulating valve 31 has been set at desired pressure, and a capacity pot, not shown, upstream of the valve 31, has been regulated as to the volume of compressed air that can be delivered for any desired operation. The operation of cleaning is then started by opening the valves 33 and 41. The compressed air then passes through the conduit 32 and upwardly through the tube 36, which serves as a jet nozzle to create a venturi tube effect.

The passage of the compressed air upwardly through the orifice or discharge port of the tube 36 thus creates a venturi effect which draws the cleaning fluid, as a non-toxic, relatively non-inflammable hydro-carbon compound, as Varsol, from the conduit 40 to pass upwardly around the tube 36, and upwardly through the pipe 15, in admixture with the compressed air from the tube or nozzle 36. The mixture thus passes upwardly through the coupling 12 and into the diffuser 14 and out through the perforations therein and through the perforate filter core 26 to pass through the filter material 27, which may be a cellulose product, as Celotex, or a plastic, as fiber glass, as aforesaid.

The cleaning admixture, laden with deposit removed from the filtering material 27, passes outwardly through the perforate wall 28 and downwardly through the holes 39 in the cage bottom 54 to pass out through the drain coupling 45 having a valve 46 connected thereto from which extends a drain conduit 60. With the valve 46 open the contaminated cleaning fluid may be drawn off through the conduit 60 into a container, or allowed to discharge, as into a fuller's earth pit for recovery, or as into a disposal means.

After a filter 17 is cleaned, it is only necessary to unthread the clamp 20, raise the lid 22, and lift the cleaned filter 17 from the compartment 11. Then the diffuser 14 can be unthreaded from the coupling 12, and removed, along with the frusto-conical gasket 55 and spider 57, in case a different size filter is next to be cleaned, or all may be left in place in case a filter of the same size is next to be cleaned.

As shown in FIG. 2, the gasket 55 shown in FIG. 1 is omitted, and in this case a diffuser 14a is shown having an externally threaded sleeve 66 affixed thereon, also a hex nut 67 is connected to the diffuser 14a below the sleeve 66 to support thereon an annular ring or platform plate 68 which extends around the diffuser 14a just below the lower end of the sleeve 66. Thus, the annular plate 68 and nut 67 therebelow comprise together a platform nut 70 to support the spider 57 on the upper surface of the platform plate 68. As in the case of the diffuser 14 shown in FIG. 1, the lower end of the diffuser 14a is threadable into the upper end of the coupling 12. The studs 58 are of height to stand above the top of the threaded sleeve 66, so that in the relatively uppermost position of adjustment, of the filter 17, with the filter bottom threads 69 engaged with the uppermost threads of the sleeve 66, the studs 58 still stand high enough above the upper surface of the filter bottom 54 that they lift the gasket 53 in ample degree to let the contaminated cleaning fluid escape through the openings 39.

Then, as the filter bottom threads 69 are threaded downwardly on the diffuser sleeve 66, the studs 58 stand relatively higher and higher above the filter bottom 54, and thus push the gasket 53 and bearing ring 52 thereon farther and farther above, and away from, the filter bottom 54, to provide freer escape fluid access to the escape holes or ports 39, the spring 51 between bearing ring 52 and filter closure 49, and around the lower, unperforated portion 83 of the inner cylinder 26, being compressed.

Obviously there can be filters which may have valved openings to serve as inlets when the filter is in service on an automobile and such openings may not be accessible in manner that the valve element, as a gasket, cannot be lifted by the insertion of some lifting means through the filter cage bottom. In such cases, as shown in FIGS. 3 and 4, an outlet opening 72 may be drilled through the filter cage wall 50a just above the cage bottom 54a and such will serve as an outlet for the deposit laden cleaning fluid as the filter is cleaned. Then, the opening 72 may be closed so that the filter may be put back in service, by providing a bolt 73 with head 74 which can be of lesser diameter than the opening 72, and a pliable washer 75a provided, as of lead, and of diameter to fit around the opening 72 on the inside of the filter cage 50a also a similarly constructed washer 75b may be provided through which the bolt 73 extends outwardly of the cage 50a, the bolt 73 extending furher outwardly through a special washer 76 with arcuate inner surface 76a concentric with the surface of the cage 50, the bolt outer end having a nut 77 threaded onto its outer end. Thus, when the nut 77 is threaded up on the bolt 73, the washers 75a, 75b are deformed firmly and positively to close the opening 72 against leakage. Also the nut and bolt 77, 73 may be drilled so that a cotter pin 78 may be inserted therethrough to restrain the nut 77 from being unthreaded and lost in service.

Filters of various types may be cleaned by the inventions hereinabove described, and in many cases the filters which are cleaned may not be designed to have the escape holes from the filter bottoms covered by gaskets, as the gasket 53 shown in FIGS. 1 and 2. As regards these filters shown in FIGS. 1 and 2, when they are in service in an automobile, their respective gaskets 53 carry out the functions of a flapper valve or check valve element.

In many cases the filters to be cleaned do not have gaskets with valve element functions of this nature to control the openings 39, as shown in FIGS. 1 and 2, which serve as inlets for the oil when a filter is in service in an automobile. Thus, it is not necessary to provide a means to open these openings when a filter without a gasket of the type described is to be cleaned, with cleaning fluid circulated in reverse direction to direction of lubricating oil flow when theh filter is in service. Thus, in order to dispose such filters to be cleaned it is not necessary to use the spider 57 shown in FIGS. 1 and 2, or the platform nut 70 shown in FIG. 2, and the parallel phantom lines 71 in FIG. 2 indicate a combination in which the spider 57 is omitted while the platform nut 70 on the diffuser 14a would thus serve no purpose.

The invention may be made in a variety of modifications and embodiments and practiced with a variety of method steps and procedures, all within the general concept of the broader objects and within the main spirit of invention. For instance, as aforesaid, when there is no check valve means to occlude openings in the bottom of the filter cage it is only necessary to clamp the filter sealably upon a gasket, as in the gasket 55 shown in FIG. 1, or to thread the filter bottom on the diffuser when a diffuser of the type shown in FIG. 2 is employed. Also, as aforesaid, in cease of a filter having valve covered service circulation inlets which are inaccessible to be opened from the bottom, an opening may be made therein to serve as cleaning fluid outlet, as shown in FIGS. 3 and 4, the opening being closed before the cleaned filter is returned to service.

As may be derived from a consideration of FIGS. 1 and 2, a filter to be cleaned comprises a perforate core and an annular mass of filtering material therearound, and an outer perforate cylinder or retaining member which holds the filter material in form and which is perforate to permit the cleaning material to be passed outwardly therethrough. However, filters to be cleaned may be made in various other ways. For instance, the outer forming member may also be comprised of a filtering material as in the case of the number of commercially prominent filters now on the market which do not provide a filtering material between the core and the outer forming member but rather the outer forming member itself comprises of the filtering means and is in the shape of an accordion, so that in service in an automobile matter to be filtered out and deposited, in part impinges on the outer surface of the accordion shaped filtering means, while another part, in the process of passing through the porocities thereof, is imbedded therein.

Various features and accessories may be included as improvements or to serve special conditions. For instance, in colder climates or in cold seasons, the cleaning fluid may be pre-heated before delivery through the conduit 65 into the tank or reservoir 38.

Also, where special speed in operation is desired filters of the type that may be clamped, as shown in FIG. 1, may be clamped into position by the downward movement of a piston from a hydraulic or pneumatic cylinder, the pressure developed being in excess of any opposing pressure of the entering cleaning fluid acting against the underside of the filter top. Also, as another feature to obtain speed of operation, a spacer may be interposed between the top of a filter to be cleaned and the clamp means, including a guide sleeve lowermost to cover say the upper third of the filter cage. The clamp means thus needs to be moved a much shorter distance in order to effectively clamp the filter to be cleaned.

Also, the invention is not limited to the exact structures shown for carrying out its objects, but other strucures may serve as well. For instance, the fingers or studs, corresponding in function with the studs 58 of the respective spiders 57 shown in FIGS. 1 and 2, need not be of rod or bolt stock but may be comprised of flexible spring wires employable as probers to enter openings in the filter cage bottom to lift the gasket which occludes these openings.

What is claimed is:

1. A filter cleaner for cleaning a filter having a perforate core and filtering material therearound and an enclosing cage including a closed top and a bottom having opening means up thereinto and pliant valve means occluding said opening means, whereby in service oil has flowed inwardly through said material to depos it thereon in passing therethrough into said core, said filter cleaner comprising a compartment having a drain therefrom and an upstanding diffuser, first yieldable means between said closed top and said core, second yieldable means between said core and said valve means to clamp said filter to bear against said cage, a tubular connection connected to commuicate with said diffuser, a cleansing liquid tank, means connecting said tank to communicate with said connection, a jet nozzle extending into said connection and directed to discharge into said diffuser, filter disposing means to sealably position a filter to be cleaned over said diffuser including a frusto-conical gasket to seal between said filter bottom and said diffuser, lift means including a spider relatively slidable with relation to said cleaner and from which upstand means extending through said filter opening means to raise said filter valve means against the tensioning of both said yieldable means thus adjustably to dispose said filter with relation to said diffuser, and means to conjointly supply compressed air to said nozzle and to said liquid tank whereby atomized cleansing liquid passes into and from said diffuser and through the filter core and outwardly through said material to remove deposit in cleansing the filter and to pass through said opening means and out through said drain as soiled cleasing fluid.

References Cited

UNITED STATES PATENTS

| | | | |
|---|---|---|---|
| 2,707,474 | 5/1955 | Wiginton | 134—102 |
| 2,788,008 | 4/1957 | Wanzer | 134—102 XR |
| 2,919,704 | 1/1960 | Butler | 134—102 |
| 3,044,475 | 7/1962 | Thompson | 134—166 XR |
| 3,295,539 | 1/1967 | Schlageck | 134—169 XR |

ROBERT L. BLEUTGE, *Primary Examiner.*

U.S. Cl. X.R.

134—1, 166